Aug. 13, 1935.   C. J. ROWE   2,010,930
SEAL FOR REFRIGERATING APPARATUS
Filed Jan. 22, 1931   3 Sheets-Sheet 1
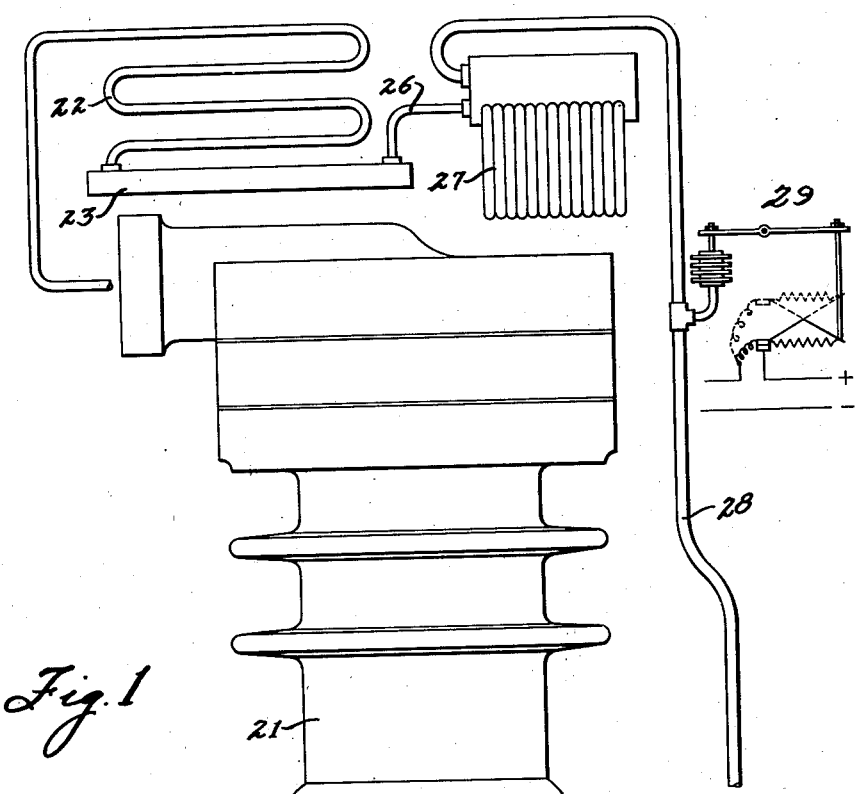
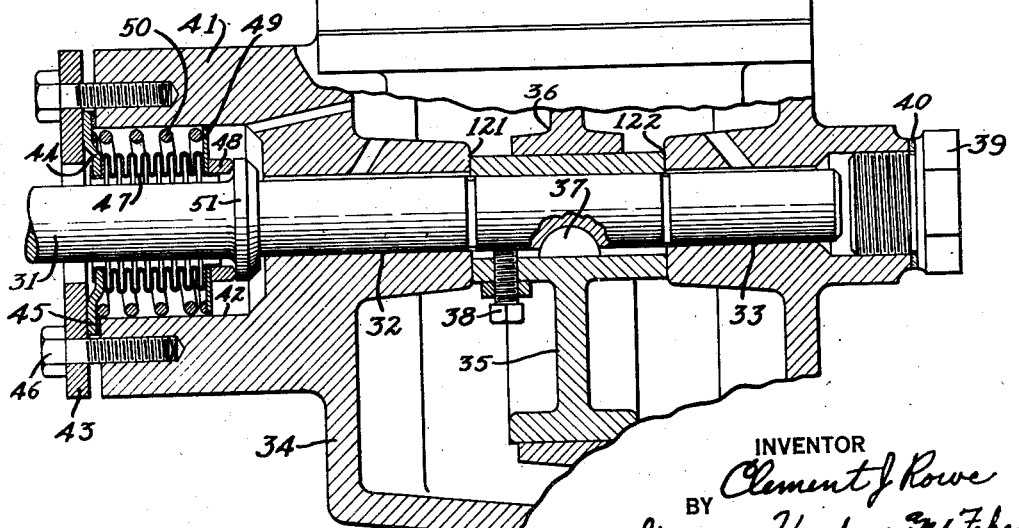
INVENTOR
Clement J. Rowe
BY
Spencer Hardman and Fehr
ATTORNEYS Aug. 13, 1935. C. J. ROWE 2,010,930
SEAL FOR REFRIGERATING APPARATUS
Filed Jan. 22, 1931   3 Sheets-Sheet 2

INVENTOR
Clement J. Rowe
BY
Spencer Hardman and Feh
ATTORNEYS

Patented Aug. 13, 1935

2,010,930

UNITED STATES PATENT OFFICE 2,010,930

SEAL FOR REFRIGERATING APPARATUS

Clement J. Rowe, Dayton, Ohio, assignor, by mesne assignments, to General Motors Corporation, a corporation of Delaware Application January 22, 1931, Serial No. 510,339

4 Claims. (Cl. 286—11)

This invention relates to refrigerating apparatus and more particularly to a means for sealing the shaft opening in a fluid containing chamber such as the crankcase of the compressor.

In a refrigerator employing the compression type of refrigerating system, a compressor is either driven by external means such as an electric motor either directly connected or driven by gearing or belt means, or the compressor and its driving means are mounted together within a sealed unit. In the type of compressor which is driven from an external source, it is necessary to provide means for preventing the escape of refrigerant from the compressor through the shaft opening. Many different types of sealing means have been provided for such service. One of the most satisfactory means has been a type of packing in which a bellows has a sealing ring connected at one end which bears against a shoulder. There are two different forms of such a seal, a stationary form in which the bellows has one end fastened to a portion of the wall of the crankcase and has the other end connected to the sealing ring which is pressed against a shoulder upon the shaft, and a rotating form in which the bellows has one end connected to a portion of the shaft and the other end connected to the sealing ring which is pressed against a portion of the wall of the crankcase.

There, however has been considerable difficulty with this bellows type of packing in that excessive spring pressure was required to hold the sealing ring against the surface with which it maintains its seal. One of the reasons for this was the fact that the pressures within the crankcase and the compressor vary in extreme cases from 150 lbs. pressure to 10″ vacuum. It was thought necessary to use an extremely heavy spring to hold the sealing ring upon its seat and to prevent leakage. One of the causes of this was the great variation in pressure within the crankcase. The pressure of the seal upon the seat was increased by the pressures within the crankcase, causing increased wear.

Consequently one of the objects of the invention is to reduce the spring pressure required in the bellows type of shaft seal.

Another object of the invention is to provide an improved shaft seal having an improved means for centralizing the sealing ring with respect to the shaft.

Another object of the invention is to provide an improved shaft seal which is balanced against the crankcase pressures, or more generally a seal which is balanced against pressures within the fluid containing unit.

Further objects and advantages of the present invention will be apparent from the following description, reference being had to the accompanying drawings, wherein a preferred form of the present invention is clearly shown.

In the drawings:

Fig. 1 is an elevation of the compressor, partly in section embodying one form of the invention together with a diagrammatic illustration of the remaining elements of the refrigerating system;

Figure 2:
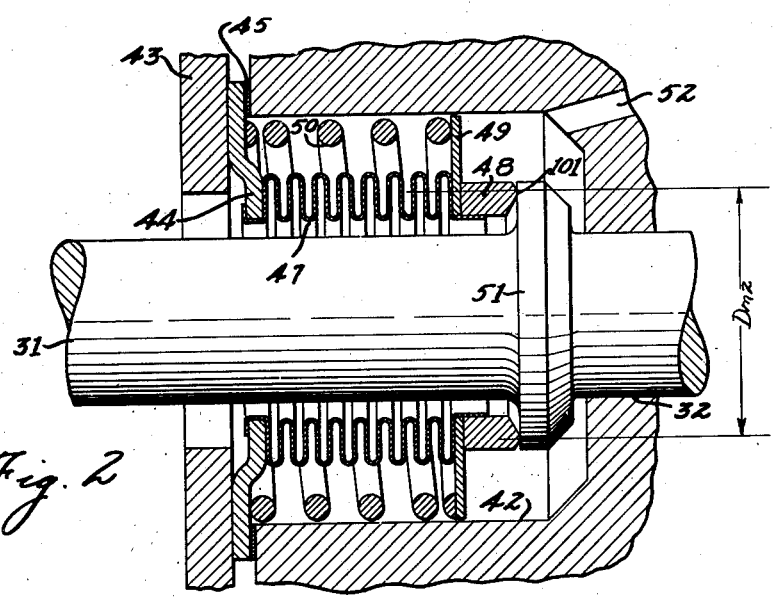
Fig. 2 is an enlarged view of the portion of the compressor embodying the invention.

In Fig. 1, for illustrative purposes, there is shown a compressor 21 for compressing the refrigerant and for forwarding it to the condenser 22 where it is liquefied and collected in the receiver 23. A supply conduit 26 conducts liquid refrigerant from the receiver 23 to the evaporator 27 where the liquid refrigerant vaporizes because of the absorption of heat and is returned to the crankcase 34 of the compressor 21 through the return conduit 28. The compressor is preferably driven by an electric motor (not shown) which is connected by pulley and belt means (not shown) to the driving shaft 31 of the compressor 21. A pressure responsive switch means 29 is preferably connected to the return conduit 28 for controlling the electric motor to provide alternating operating and idle periods of the compressor according to the pressure and consequently the temperature of the evaporator.

The driving shaft 31 of the compressor is supported upon the bearings 32 and 33 which are formed in the walls of the crankcase 34 of the compressor 21. The driving shaft 31 is provided with an eccentric 35 for reciprocating the eccentric rod 36 and the piston which is connected to the upper end of the rod 36. The eccentric is keyed to the shaft by the Woodruff key 37, and prevented from moving longitudinally of the shaft by the set screw 38. The longitudinal thrust upon the shaft is taken by the eccentric 35 which is positioned between the shoulders 121 and 122 of the bearings 32 and 33. Access to one end of the shaft 31 is provided by a threaded cap 39 which is provided with a sealing gasket 40. The opposite end of the shaft projects outside of the crankcase for connecting the driving means and if desired a flywheel (not shown).

My improved seal is provided at this end of the shaft for preventing the escape of gaseous refrigerant and lubricant from the crankcase 34 and for preventing air from entering the crankcase through the shaft opening. My invention is applicable to either the stationary or the rotary form of seals, but I have illustrated my invention with the simpler stationary form of seal only. To this end a large boss 41 projects from the walls of the crankcase 34 near the bearing 32 and is provided with a recess 42 for containing the shaft seal. At the end of the boss 41 there is an annular plate 43 surrounding the shaft 31 and by means of the cap screws 46 this plate 43 clamps the bellows plate 44 and a lead gasket 45 against the end face of the boss 41 to form a fluid tight seal. The bellows 47, the sealing ring 48, the centering collar 49, and the coil spring 50 will be described after an explanation of the theory of the seal.

Figure 4:
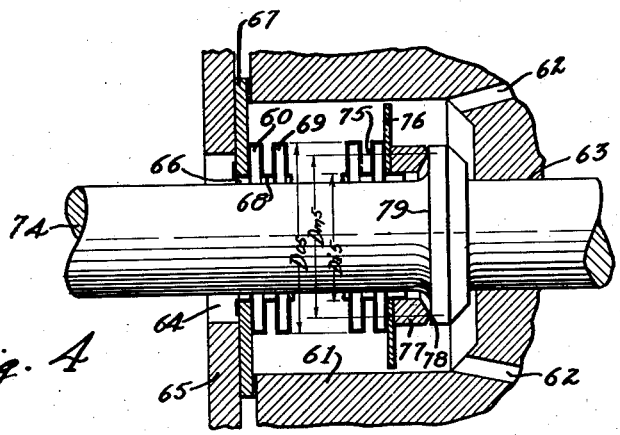
Fig. 4 is a diagrammatic illustration of the principle of the invention.

The theory of my improved bellows seal will be explained with reference to Fig. 4. In Fig. 4 a bellows 60 is shown having an outer diameter of $Do5$ and an inner diameter of $Di5$. For the purpose of illustration, the bellows are shown having square corrugations and may be considered to be of a negligible thickness. $Dm5$ is the diameter of a circle which equally divides the area of one of the webs of the bellows 60, that is the area between $Do5$ and $Di5$. Crankcase pressure surrounds the bellows 60 since the recess 61 is in communication with the interior of the crankcase by means of the oil passages 62 and the bearing 63. Atmospheric pressure has access to the interior of the bellows through aperture 64 in the annular plate 65 and the aperture 66 in the bellows plate 67 to the interior of the bellows 60. The pressure applied to a section of the web of the bellows 60 is concentrated on the circle $Dm5$ since $Dm5$ passes through the center of pressure of each and every section taken through the web. This circle $Dm5$ is therefore called the annular center of pressure. The pressure exerted upon the sides of the bellows causes a reaction on the inner and outer folds 68 and 69 of the bellows 60. By taking moments through a section of the web, it is found that the pressure which is concentrated on the circle $Dm5$ causes, in the present case, about 55% of the total force to be carried by each outer fold of the bellows and about 45% on each of the inner folds of the bellows. This difference is caused by the fact that the moment arm between $Do5$ and $Dm5$ is shorter than the moment arm between $Dm5$ and $Di5$.

The bellows 60 assumes a condition of static equilibrium. Beginning at the end of the bellows 60 nearest the bellows plate 67, it will be seen that the forces in an axial direction upon a section of the bellows above and below the line $Dm5$ are balanced. The axial forces due to pressure upon the portion of the first fold of the bellows above the line $Dm5$ are absorbed by the bellows plate 67 which is rigid. The forces in an axial direction upon the portion below the line $Dm5$ of the inner fold shown designated by reference character 68 are balanced because the U-shape of that portion of the bellows presents a balanced surface on account of its symmetrical shape. In the same way the forces in an axial direction upon the portion above the line $Dm5$ of the outer fold 69 are balanced because the inverted U-shape of the outer portion of the bellows presents a symmetrical surface. The forces are therefore balanced up to the point indicated by the reference character 75. A collar 76 and a sealing ring 77 is soldered to the inner end of the bellows 60. This sealing ring 77 is provided with a sealing surface 78 which is of negligible width so that it merely makes a circular line contact with the shoulder 79 which it bears against. This sealing surface 78 has a diameter equal to the diameter of the circle $Dm5$. The force carried by each of the outer folds of the bellows is proportional to the area between the diameters of the circles $Do5$ and $Dm5$, since the circle $Dm5$ equally divides the area on the web of the bellows. It will now be seen from inspection of Fig. 4, that the portion of the surface of the bellows and sealing ring between the circle at the points 75 and 78 is balanced against the crankcase pressure which surrounds the bellows 60. This is true because both the circles 75 and 78 have a diameter of $Dm5$ and the surface between these two circles has an equal projected area upon which the crankcase pressure is exerted in either direction parallel to the shaft 74. The surfaces on the inner side of the bellows 60 between the circles 75 and 78 are also balanced for the same reason. Therefore in the embodiment shown in Fig. 4 applicant has provided a seal which is balanced against pressures exerted on either side of the seal. It will be understood that my invention is equally applicable to the rotating form of seal.

Figure 5:
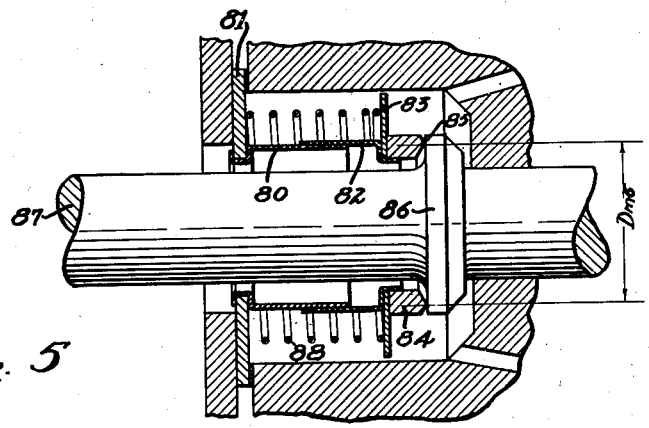
Fig. 5 is another embodiment of the invention.

In Fig. 5 there is an embodiment which will illustrate this balanced condition more clearly. In this embodiment the bellows 60 has been replaced by a pair of sleeves, one of which telescopes within the other. The smaller sleeve 80 has one end fastened and preferably soldered to the bellows plate 81 and has an outer diameter of $Dm6$. The larger sleeve 82 slips over the inner sleeve and has an inner diameter of $Dm6$. The inner end of the outer sleeve 82 has a centering collar 83 and a sealing ring 84 soldered thereto. The sealing ring 84 has a sealing surface 85 which bears against the shoulder 86 upon the shaft 87. The annular sealing surface is of a negligible width and also has a diameter of $Dm6$. It will therefore be seen that the pressure on the movable portion of the seal, that is the sleeve 82, the collar 83 and the sealing ring 84, are balanced since the surfaces of the seal which are inside of the circle having a diameter of $Dm6$ are balanced against any crankcase pressure since the projected area upon which the crankcase pressure would exert a force in one axial direction is exactly equal to the projected area which would exert a force in the exactly opposite direction. The same is true of the surfaces inside of the circle of the diameter $Dm6$ which are exposed to atmospheric pressure. A light coil spring 88 concentric with the sleeves 80 and 82 bears against the bellows plate 81 and the collar 83 to keep the sealing ring bearing against the shoulder 86. The sole requirement of the spring is to keep the sealing ring against the shoulder. It is not required to exert any pressure in order to overcome fluctuating crankcase pressure or to overcome any atmospheric pressure which fluctuates through a comparatively small range. It will be seen that my principle of invention is not limited to a seal embodying a bellows.

Figure 6:
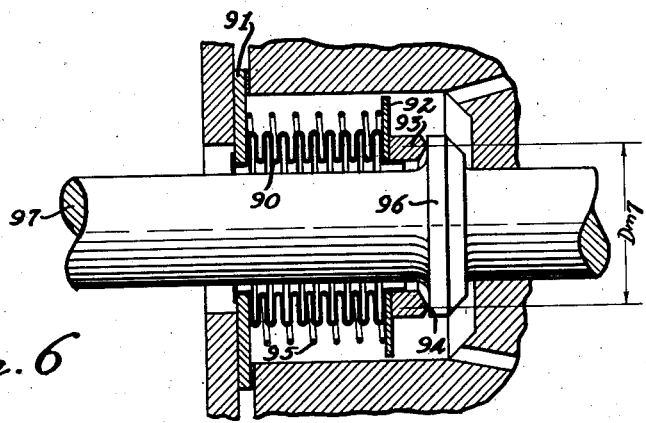
Fig. 6 is a practical embodiment of a form shown in Fig. 4.

In Fig. 6 there is shown an embodiment somewhat similar to Fig. 4 but which employs a bellows 90 of the sylphon type having an annular center of pressure of $Dm1$. This bellows is fastened and preferably soldered at one end to the stationary bellows plate 91 and at the other end is soldered to the centering collar 92 and the sealing ring 93 which has a sealing surface 94 of negligible width and of a diameter equal to the annular center of pressure $Dm1$. It will be seen by comparison with Figs. 4 and 5 that this seal is also balanced against both crankcase pressure and atmospheric pressures. A light coil spring 95 is provided which bears against the bellows plate 91 and the centering collar 92 to hold the sealing surface 94 against the shoulder 96 upon the shaft 97. This spring is provided to overcome the physical resistance of the bellows 90 and also to provide a seating pressure upon the sealing surface 94. Due to unavoidable differences, the resiliency and the length of different bellows manufactured according to the same specification varies and for this reason as well as to provide a seating pressure, it is desirable to provide a light spring such as 95 to hold the sealing ring 93 against the shoulder 96. However, if desired, the bellows may be used which are slightly longer than necessary and the resiliency of the bellows themselves will act as a spring and hold the sealing ring against the shoulder without the necessity of an additional spring such as the coil spring 95.

In Fig. 2 there is shown an enlarged view of the preferred form of seal which is also shown in connection with Fig. 1. The bellows 47 of this seal has an annular center of pressure of $Dm2$. The sealing ring 48 is soldered to the free end of the bellows and has an annular sealing surface 101 having a width of approximately 1/32 of an inch, and an outer diameter of $Dm2$. The sealing ring is preferably lapped to provide as nearly a perfect surface as possible. The centering collar 49 is soldered in between the end fold of the bellows 47 and maintains the sealing ring 48 concentric with the shaft 31. The stationary end of the bellows 47 is spun over the edge of the aperture in the bellows plate 44 and soldered. The coil spring 50 surrounds the bellows 47 and has one end bearing against the bellows plate 44 and the other end bearing against the centering collar 49 to hold the sealing surface or seat 101 against the shoulder 51. The shoulder 51 is preferably ground and burnished to provide as nearly a perfect surface as possible for the sealing surface 101 to bear against. Both the shoulder and the sealing ring are preferably made of materials offering the greatest resistance to wear. An oil passage 52 connecting with the crankcase is provided for supplying oil to the sealing surfaces. The shoulder 51 is shown integral with the shaft 31 for simplicity of manufacture but it may be made as a separate ring and fastened to the shaft 31 by a fluid tight joint. While these surfaces are shown as being perpendicular to the axis of the shaft, if desired, they may be made at an angle or curve.

In this seal the forces resulting from crankcase pressure will be balanced since the outer diameter of the sealing surface is equal to the annular center of pressure of the bellows 47, which is designated as $Dm2$. Since, in this form the sealing ring has a narrow sealing surface or seat, the seal will be substantially balanced against atmospheric pressure but there is a small unbalanced area which is equal to the area of the seat and upon which atmospheric pressure is exerted which will tend to hold the sealing ring 48 against the shoulder 51. This force however, is comparatively small because of the small area of the sealing surface. With a narrow seat a perfect contacting surface can be more easily obtained. The coil spring 50 provides an added seating pressure for the sealing surfaces. It has been found that the seat is properly maintained without the use of a spring but the spring is employed on account of the variations in resiliency and flexibility of the manufactured bellows.

Figure 3:
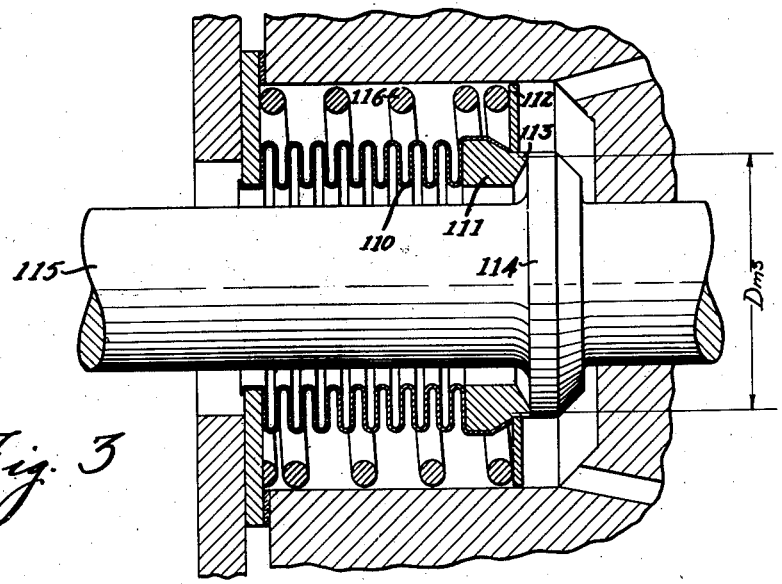
Fig. 3 is a modified form of the invention.

In Fig. 3 is shown another embodiment of the invention. In this embodiment the bellows 110 is fastened to the outside of the sealing ring 111. The collar 112 surrounds the sealing ring 111. The bellows 110 has an annular center of pressure having a diameter $Dm3$. The sealing ring has an annular sealing surface 113 which bears against the shoulder 114 upon the shaft 115. This sealing surface has an inner diameter of $Dm3$. This seal is balanced against atmospheric pressure because the inner diameter of the sealing surface 113 is equal to the diameter of the annular center of pressure $Dm3$ of the bellows 110. Due to the width of the sealing surface 113 there is a small unbalanced area which is acted upon by crankcase pressures and this causes a force which varies with the crankcase pressure to hold the sealing ring 111 against the shoulder 114. The coil spring 116 surrounds the bellows 110 and aids in holding the bearing ring 111 against the shoulder 113. This spring is provided to take care of the variation of the bellows and to aid in seating the sealing ring.

While in the embodiment shown the bellows have one end fastened to the wall of the crankcase and a sealing ring which bears against a shoulder upon the shaft at the other end, I am aware that this relation may be reversed and that one end of the bellows may be fastened to the shaft and a sealing ring connected to the other end which may bear against a portion of the wall of the crankcase. It will be seen that I have provided an improved shaft seal which may be applied to any form of apparatus which in any of the forms is substantially balanced against fluctuating pressures on either side of the seal, and in which all of the forms are balanced on one side of the seal and some of the forms are balanced against pressures on both sides of the seal.

While the form of embodiment of the invention as herein disclosed constitutes a preferred form, it is to be understood that other forms might be adopted, all coming within the scope of the claims which follow.

What is claimed is as follows:

1. Refrigerating apparatus including a compressor having a crankcase, a driving shaft projecting from the crankcase, and means providing a seal for the shaft balanced against crankcase pressures and substantially balanced against atmospheric pressures including a shoulder upon the shaft, web means and a sealing ring having a narrow annular sealing surface with an outer diameter substantially equal to the diameter of the annular center of pressure upon the web means, said annular sealing surface being wholly within the longitudinal projection of the web means.

2. Refrigerating apparatus including a compressor having a crankcase, a driving shaft projecting from the crankcase, and means providing a seal for the shaft balanced against crankcase pressures and substantially balanced against atmospheric pressures including a shoulder upon the shaft, web means, and a sealing ring having a narrow annular sealing surface with an outer and inner diameter substantially equal to the diameter of the annular center of pressure upon the web means.

3. A shaft seal including in combination a rotatable shaft, a wall having an aperture through which the shaft projects, and a sealing means substantially balanced against fluid pressures on either side of the wall including a sealing ring and a bellows connected thereto, said sealing ring having an annular sealing surface having an inner and outer diameter substantially equal to the diameter of the annular center of pressure of the folds of the bellows, said annular sealing surface being wholly within the longitudinal projection of the bellows.

4. A shaft seal including in combination a rotatable shaft, a wall having an aperture through which the shaft projects, and a sealing means balanced against fluid pressures one side of the wall and substantially balanced against fluid pressures on the other side of the wall, said sealing means including a sealing bellows ring and a bellows connected thereto, said sealing ring having an annular sealing surface with an outer diameter equal to the diameter of the annular center of pressure upon the folds of the bellows and with the inner diameter substantially equal thereto, said annular sealing surface being wholly within the longitudinal projection of the bellows.

CLEMENT J. ROWE.